United States Patent
Greaney et al.

(10) Patent No.: US 10,072,831 B2
(45) Date of Patent: Sep. 11, 2018

(54) POOL JUNCTION BOX WITH TRANSFORMER

(71) Applicant: Intermatic Incorporated, Spring Grove, IL (US)

(72) Inventors: Andrew Greaney, Buffalo Grove, IL (US); Kyle Quirk, Huntley, IL (US); Donald Gallagher, Homewood, IL (US); Russell Nelson, Crystal Lake, IL (US)

(73) Assignee: Intermatic Incorporated, Spring Grove, IL (US)

( * ) Notice: Subject to any disclaimer, the term of this patent is extended or adjusted under 35 U.S.C. 154(b) by 0 days.

(21) Appl. No.: 15/717,243

(22) Filed: Sep. 27, 2017

(65) Prior Publication Data
US 2018/0094800 A1    Apr. 5, 2018

Related U.S. Application Data

(60) Provisional application No. 62/402,559, filed on Sep. 30, 2016.

(51) Int. Cl.
*F21V 31/00* (2006.01)
*H05K 5/00* (2006.01)
(Continued)

(52) U.S. Cl.
CPC ............ *F21V 23/02* (2013.01); *F21V 31/005* (2013.01); *H02G 3/083* (2013.01); *H02G 3/10* (2013.01);
(Continued)

(58) Field of Classification Search
CPC ...... H01L 2924/181; H01L 2224/73265; H01L 2924/14; H01L 2924/3011;
(Continued)

(56) References Cited

U.S. PATENT DOCUMENTS 2,781,737 A    2/1957  Killman
4,090,230 A    5/1978  Fuller et al.
(Continued)

OTHER PUBLICATIONS

2014 Hayward Installation and Operation Manual, *Universal ColorLogic and CrystaLogic LED Light Fixtures*, published by Hayward in New Jersey, USA. pp. 2-14 of 16 pages. (Undated; predates filing of present application).
(Continued)

*Primary Examiner* — Adam B Dravininkas
(74) *Attorney, Agent, or Firm* — Brinks Gilson & Lione

(57) ABSTRACT

A combination transformer junction box for use with pool and/or spa lighting and/or other low-voltage devices, which combination transformer junction box includes a waterproof housing having a base and a cover, a first set of terminals for low voltage, a second set of terminals for high voltage separated from the first set of terminals by a barrier, and a transformer disposed upon the base such that the transformer is within the base and does not occupy a volume defined by the cover. In one aspect a plurality of the combination transformer junction boxes may be provided together in a daisy-chain linked form configured for controlling a plurality or larger plurality of lighting and/or other low-voltage devices.

10 Claims, 8 Drawing Sheets

(51) Int. Cl.
*H02G 3/10* (2006.01)
*F21V 23/02* (2006.01)
*H02G 3/08* (2006.01)
*H05B 33/08* (2006.01)
*H05B 37/02* (2006.01)
*F21Y 115/10* (2016.01)
*F21W 131/401* (2006.01)

(52) U.S. Cl.
CPC ..... H05B 33/0854 (2013.01); H05B 37/0218 (2013.01); H05K 5/0017 (2013.01); *F21W 2131/401* (2013.01); *F21Y 2115/10* (2016.08)

(58) Field of Classification Search
CPC ........ H01L 2924/30111; F21Y 2115/10; F21Y 2101/00; H05K 5/0017; H05K 1/181; F21V 23/02; F21V 31/005; H02G 3/10; H02G 3/083; H05B 33/0854; H05B 37/0218; F21W 2131/401
See application file for complete search history.

(56) References Cited

U.S. PATENT DOCUMENTS

| | | | |
|---|---|---|---|
| 4,292,661 A | 9/1981 | Johnson et al. | |
| 4,533,786 A | 8/1985 | Borgmeyer et al. | |
| 4,559,699 A | 12/1985 | Owen et al. | |
| 4,656,689 A | 4/1987 | Dennis | |
| 4,872,102 A * | 10/1989 | Getter | H02M 7/003 307/150 |
| 4,999,757 A | 3/1991 | Poppenheimer | |
| 5,465,199 A | 11/1995 | Bray et al. | |
| 5,556,188 A | 9/1996 | Poppenheimer | |
| 5,607,224 A | 3/1997 | Tobias et al. | |
| 5,789,828 A | 8/1998 | Tremaine et al. | |
| 6,152,571 A * | 11/2000 | Ruiz | F21V 21/30 362/101 |
| 6,203,173 B1 * | 3/2001 | Duff | F21V 5/048 362/267 |
| 6,241,361 B1 | 6/2001 | Thrasher et al. | |
| 6,940,016 B1 * | 9/2005 | Cornett | H01F 27/06 174/50 |
| D536,304 S | 2/2007 | Czyz et al. | |
| D553,093 S | 10/2007 | Miller | |
| 7,705,240 B2 | 4/2010 | Armstrong et al. | |
| 7,853,339 B2 * | 12/2010 | Miller | G05B 23/021 700/28 |
| 7,855,339 B2 * | 12/2010 | Lin | H02G 3/121 174/50 |
| 7,947,903 B2 | 5/2011 | Peck | |
| 9,392,711 B2 * | 7/2016 | Potucek | H05K 5/061 |
| 9,787,072 B2 * | 10/2017 | Potucek | H05K 5/061 |
| 2006/0072323 A1 | 4/2006 | Poggi | |
| 2006/0262462 A1 * | 11/2006 | Barton | F21S 9/022 361/1 |
| 2008/0112157 A1 * | 5/2008 | Boothe | F21S 8/00 362/101 |
| 2009/0195085 A1 * | 8/2009 | Joseph | H01F 27/402 307/151 |
| 2009/0273425 A1 * | 11/2009 | Tremaine | H01F 27/02 336/90 |
| 2014/0090865 A1 * | 4/2014 | Potucek | H05K 5/061 174/50.51 |
| 2014/0092606 A1 | 4/2014 | Potucek et al. | |

OTHER PUBLICATIONS

Intermatic Pool/Spa Control Accessories Installation Operation & Service Manual, *Models: PJB2175 & PJB4175 Electrical Junction Box for Pool/SPA Luminaires*, published by Intermatic, Inc. in Illinois, USA, 2 pages. (Undated; predates filing of present application).

\* cited by examiner

POOL JUNCTION BOX WITH TRANSFORMER

CROSS-REFERENCE TO RELATED APPLICATIONS

This application is a non-provisional application which claims priority to U.S. provisional application Ser. No. 62/402,559, filed Sep. 30, 2016, which is incorporated by reference herein in its entirety.

TECHNICAL FIELD

Embodiments disclosed herein generally relate to consumer and/or commercial electrical equipment. More particularly, embodiments relate a combined junction box and transformer.

BACKGROUND

Lighting in and around pools and spas provide safety and aesthetic advantages for those locations. In many locations, the low-voltage lighting useful for such installations must include a step-down transformer that will—in most United States locations—reduce the voltage from the standard line in 120 V down to 12 V. Most local building codes and industry standards require a waterproof junction box that, for updating/retrofitting older installations may be separated from and require different structure than the required transformer.

It may be desirable to provide a combined transformer and junction box that will provide for compliance with desirable safety and regulatory mandates, as well as providing for user-friendly installation and a less cumbersome, more visually-appealing construction than separate junction box and transformer installations.

BRIEF SUMMARY

In one aspect, embodiments disclosed herein may include construction of a combined junction box and transformer, as well as methods for making and using such a device. Embodiments may include a combination transformer junction box for use with pool and/or spa lighting and/or other low-voltage loads/devices, including a waterproof housing that includes a base and a cover; a first set of terminals for low voltage disposed upon the base; a second set of terminals for high voltage disposed upon the base, and separated from the first set of terminals by a barrier; a transformer disposed upon the base such that it is within the base and does not occupy a volume defined by the cover; a plurality of input ports through which wiring enters and/or exits the housing; and a plurality of output ports through which wiring exits the housing in a manner to conduct current to a load including one or more electrical devices after said current has been directed through at least two of: the transformer, at least one terminal of the first set of terminals, and at least one terminal of the second set of terminals. A plurality of the combination transformer junction boxes can be provided in a "daisy chain" series powered by a single line in source of power (e.g., 120V AC).

DETAILED DESCRIPTION

Figure 1:
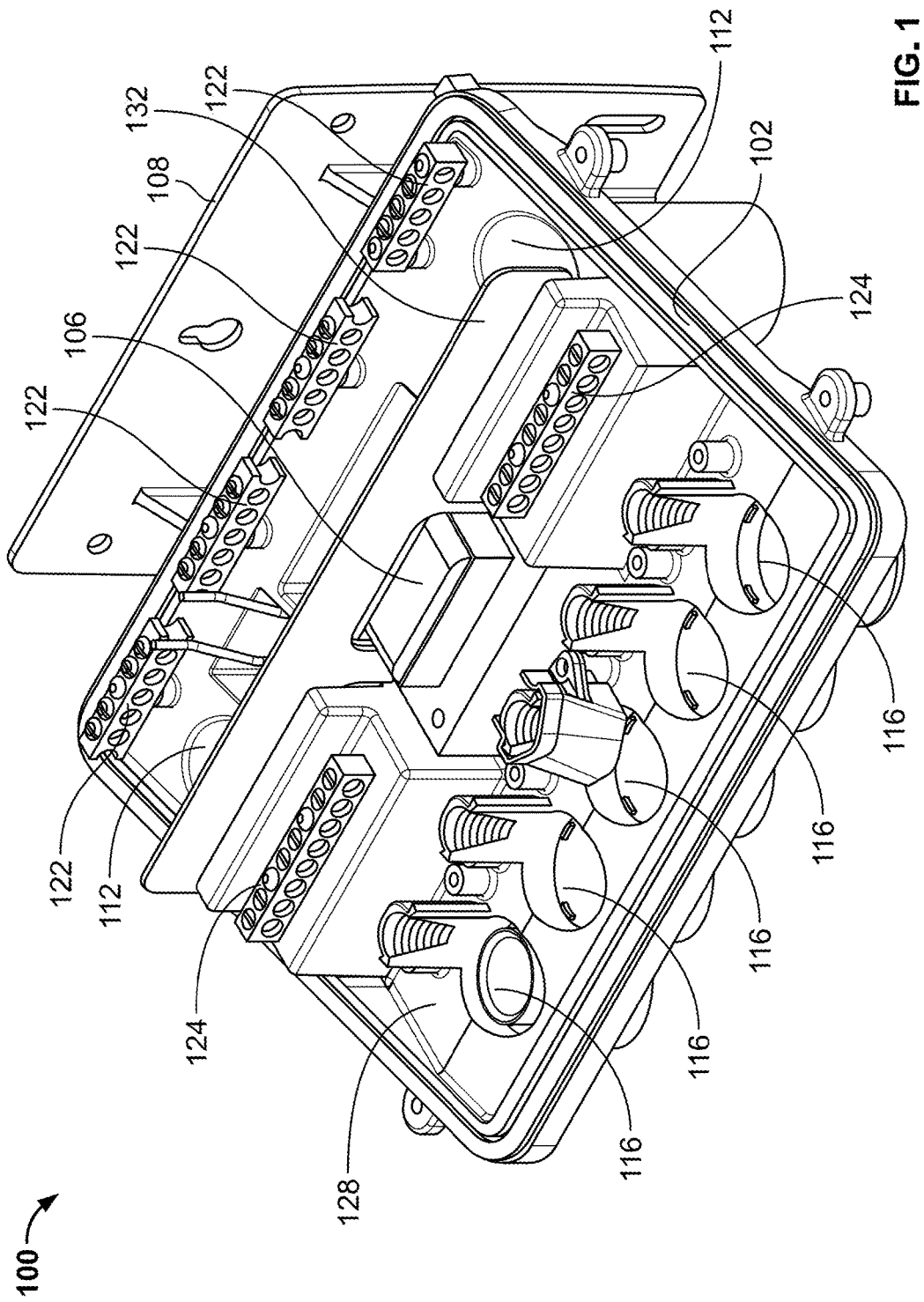
FIG. 1 shows a combination transformer junction box embodiment from a top front perspective view.

Various embodiments are described below with reference to the drawings in which like elements generally are referred to by like numerals. The relationship and functioning of the various elements of the embodiments may better be understood by reference to the following detailed description. However, embodiments are not limited to those illustrated in the drawings. It should be understood that the drawings are not necessarily to scale, and in certain instances details may have been omitted that are not necessary for an understanding of embodiments disclosed herein, such as—for example—conventional fabrication and assembly.

In this nonprovisional utility patent application, the invention is defined by the claims, may be embodied in many different forms, and should not be construed as limited to the embodiments set forth herein; rather, these embodiments are provided so that this disclosure will be thorough and complete, and will fully convey enabling disclosure to those skilled in the art. As used in this specification and the claims, the singular forms "a," "an," and "the" include plural referents unless the context clearly dictates otherwise.

The terms "about," "substantially," "generally," and other terms of degree, when used with reference to any volume, dimension, proportion, or other quantitative or qualitative value, are intended to communicate a definite and identifiable value within the standard parameters that would be understood by one of skill in the art (equivalent to an electrical engineer with experience in this field, and/or an electrician or other person with experience and/or training in basic wiring and circuitry), and should be interpreted to include at least any legal equivalents, minor but functionally-insignificant variants, standard manufacturing tolerances, and including at least mathematically significant figures (although not required to be as broad as the largest range thereof). Reference herein to any industry standards or relevant codes (e.g., ASTM, ANSI, IEEE, NEMA standards) is defined as complying with the currently published standards as of the original filing date of this disclosure concerning the units, measurements, and testing criteria communicated by those standards as of the filing date of this document unless expressly otherwise defined herein.

FIGS. 1-7 show a non-limiting example embodiment of a Pool Junction Box Transformer (PJBX) 100. Certain embodiments of the PJBX 100 preferably will include an enclosure 102 that will provide connections for up to 5 pool/landscape lights, while other embodiments may provide more or fewer connections. This product will be rated for direct connection to underwater lights, submersible fixtures and landscape lights. Current, commercially available low voltage pool luminaires connection product configurations typically separate the transformer and the junction box into two unique enclosures, which is complex and less visually appealing than a single enclosure. The illustrated PJBX 100 embodiment includes a junction box along with a transformer 106, constructed in a manner that satisfies industry-standard requirements both for junction boxes and for transformer enclosures. The transformer 106 may be, for example a 100 W (max.) transformer, but those of skill in the art will appreciate that the specific transformer properties will vary depending upon the specific intended use of a given PJBX. It is intended for use as an outdoor product and therefore preferably is configured to operate in areas exposed to extreme temperatures (−40° C. to 55° C.). The line drawing figures of this disclosure and the other images included in the parent provisional application (fully incorporated by reference herein) are exemplary, but not limiting unless expressly indicated as being so-limiting.

The PJBX 100 includes a watertight enclosure 102 with input ports 112 (which can also function as output port(s), for example, when several enclosures are linked together and utilize a single or other common line in source of power), output ports 116, terminal blocks 122 and 124, and a barrier 132 separating a high-voltage region from a low-voltage region. The watertight enclosure 102 includes a base 128 and a removable (or at least hingedly-opening) cover 130. The enclosure 102 may be transparent, translucent, or opaque, and it may be constructed of any appropriate material including, for example, black polycarbonate. The enclosure 102, when the cover 130 is secured to the base 128, preferably satisfies the criteria of NEMA 4× rating for enclosures.

Figure 2:
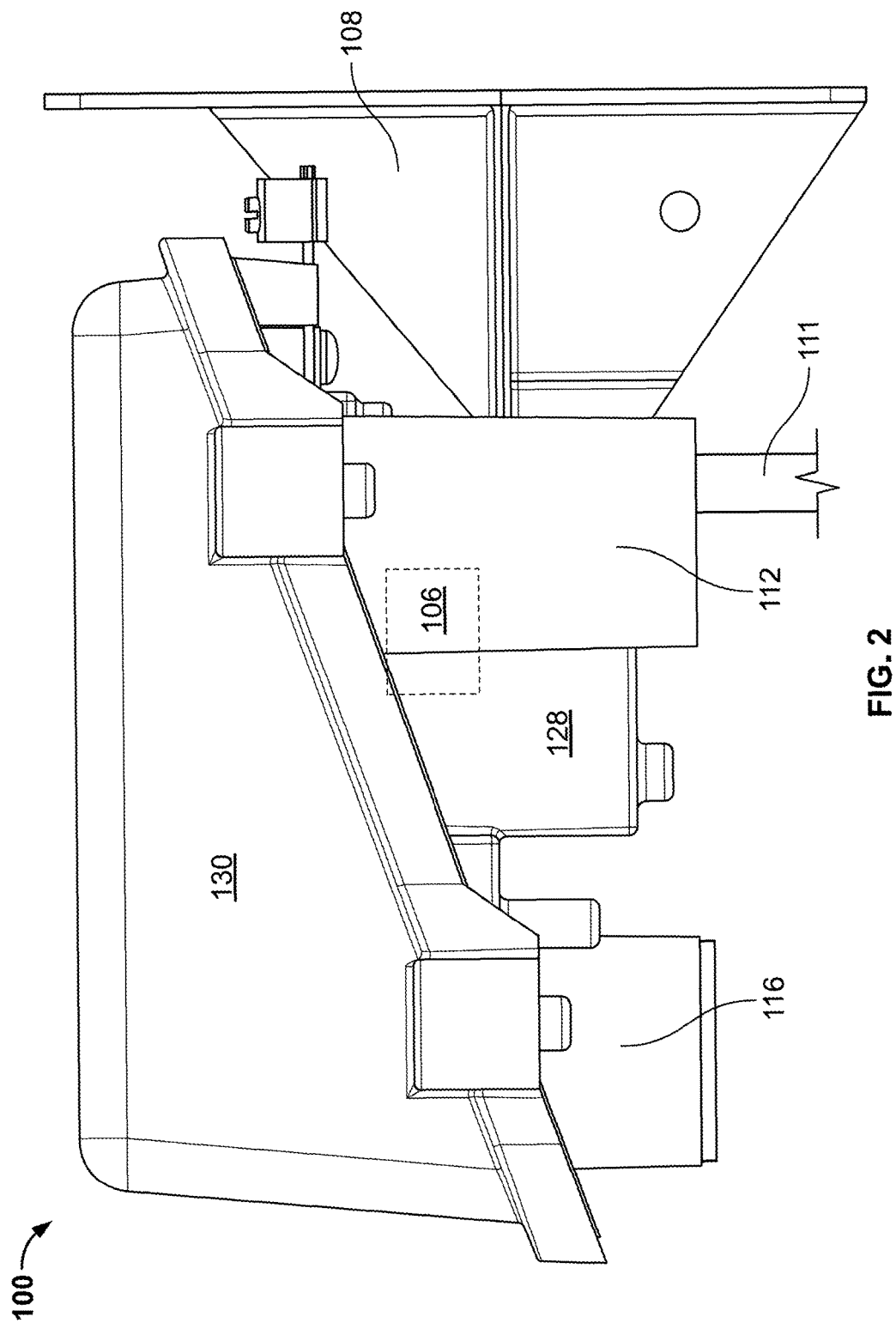
FIG. 2 shows a side elevation view thereof, with a cover installed.
Figure 3:
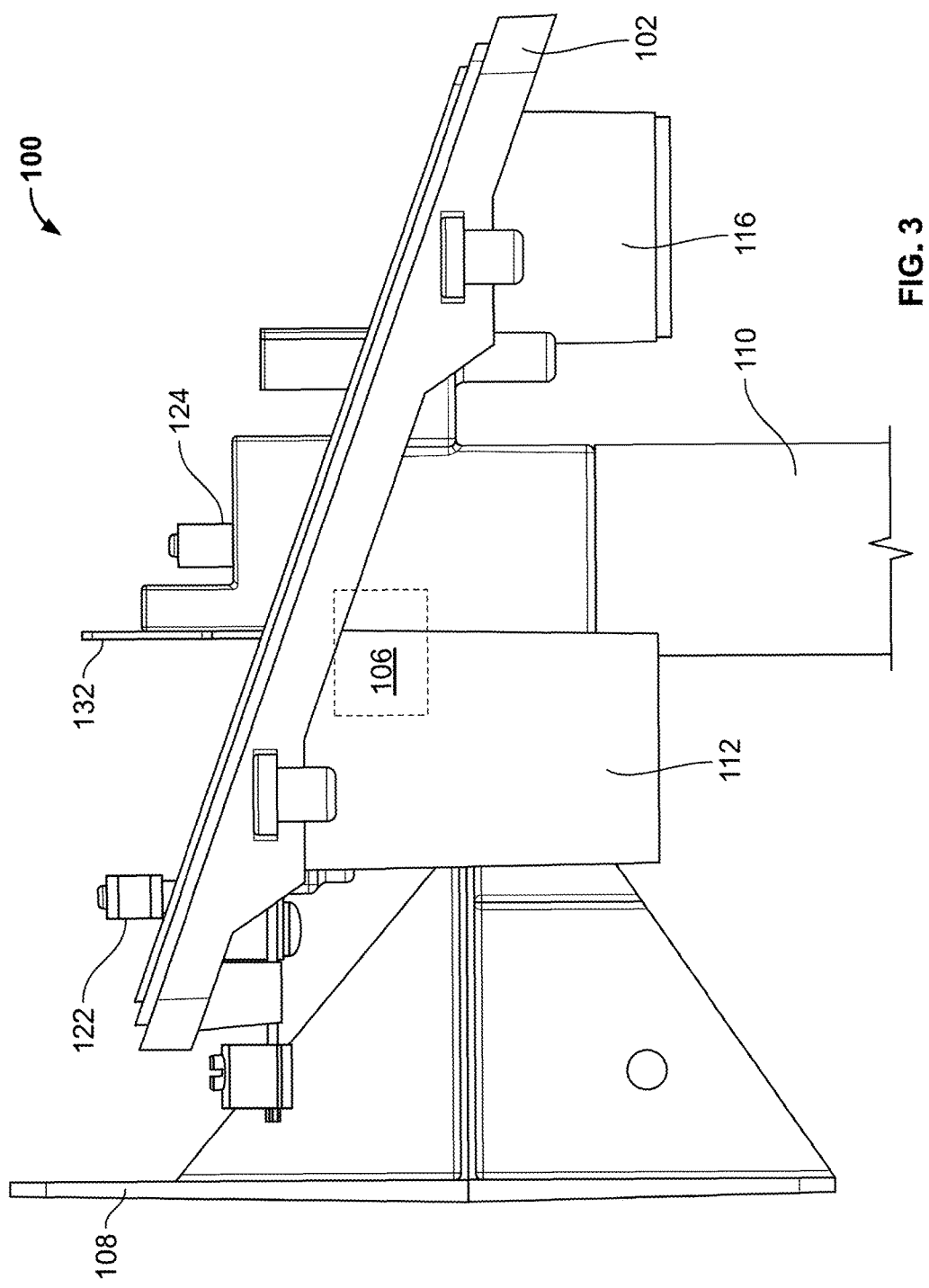
FIG. 3 shows an opposite-side elevation view thereof, with a cover not installed.
Figure 5:
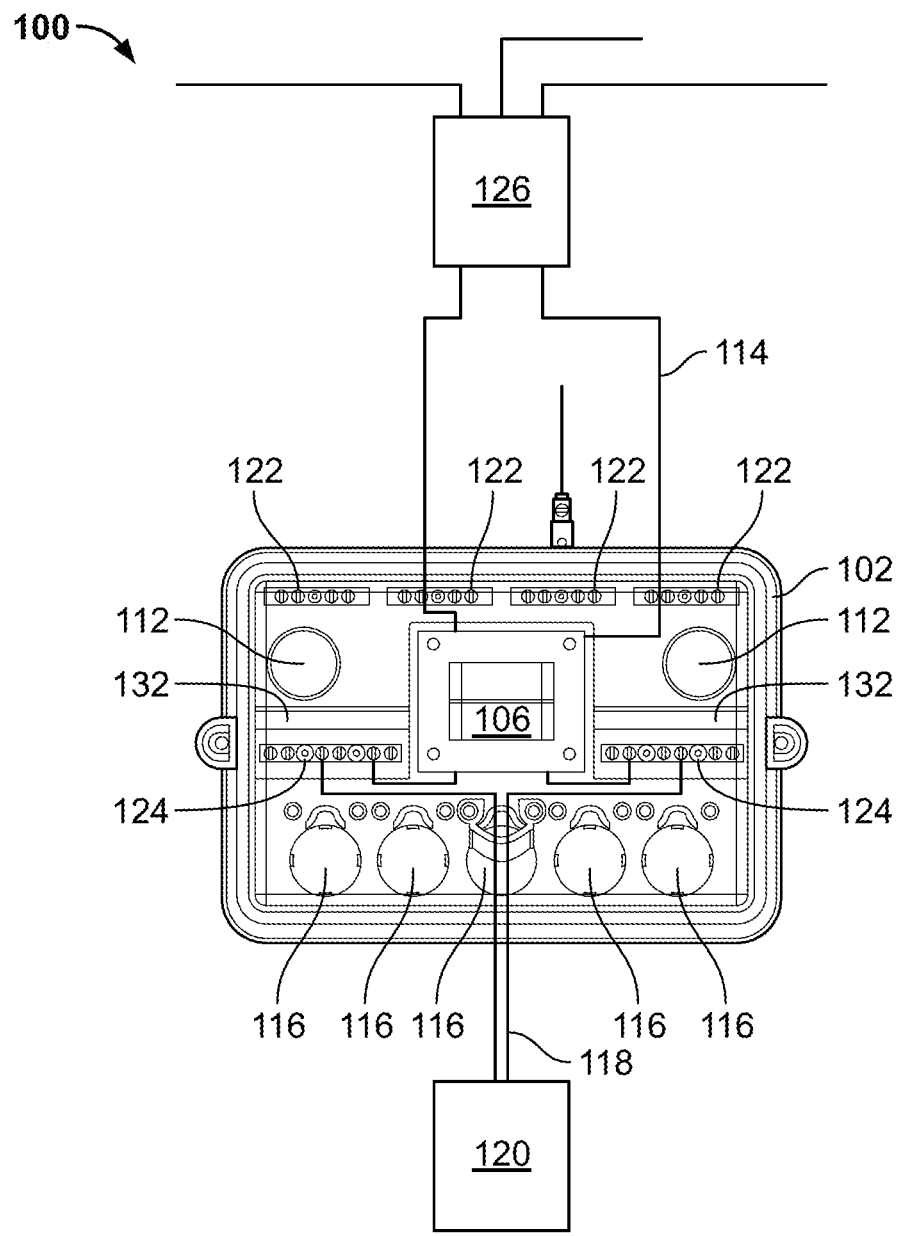
FIG. 5 is a simplified view thereof, diagrammatically showing portions of wiring for a 5-output embodiment.
Figure 5A:
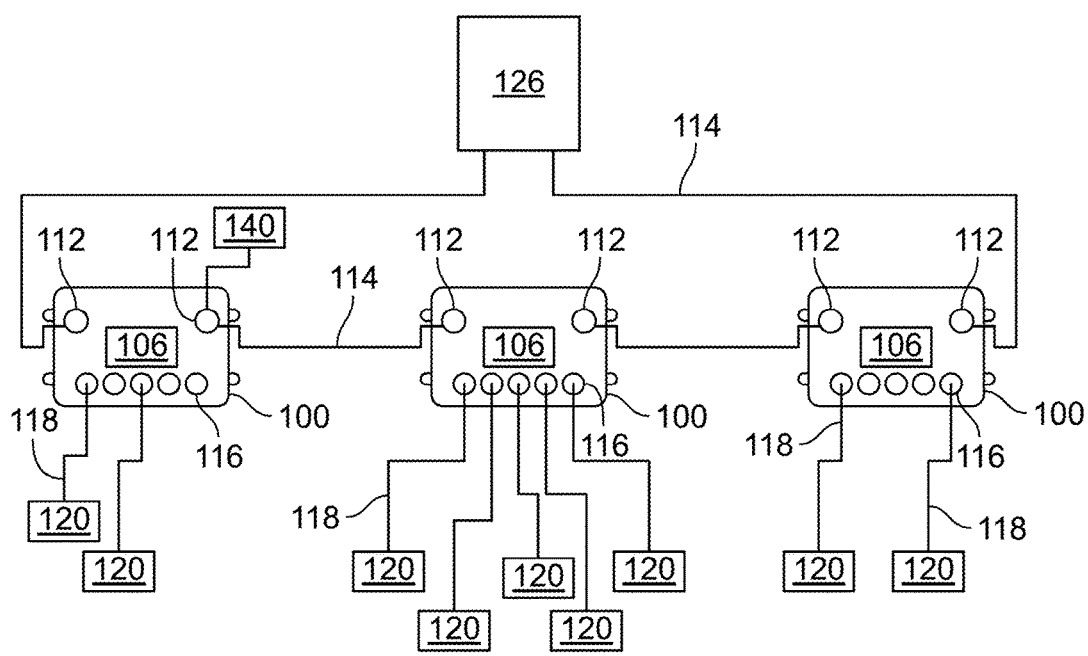
FIG. 5A is a diagrammatically simplified view of an example embodiment with three-plus PJBXs being connected in a daisy-chain configuration.
Figure 6:
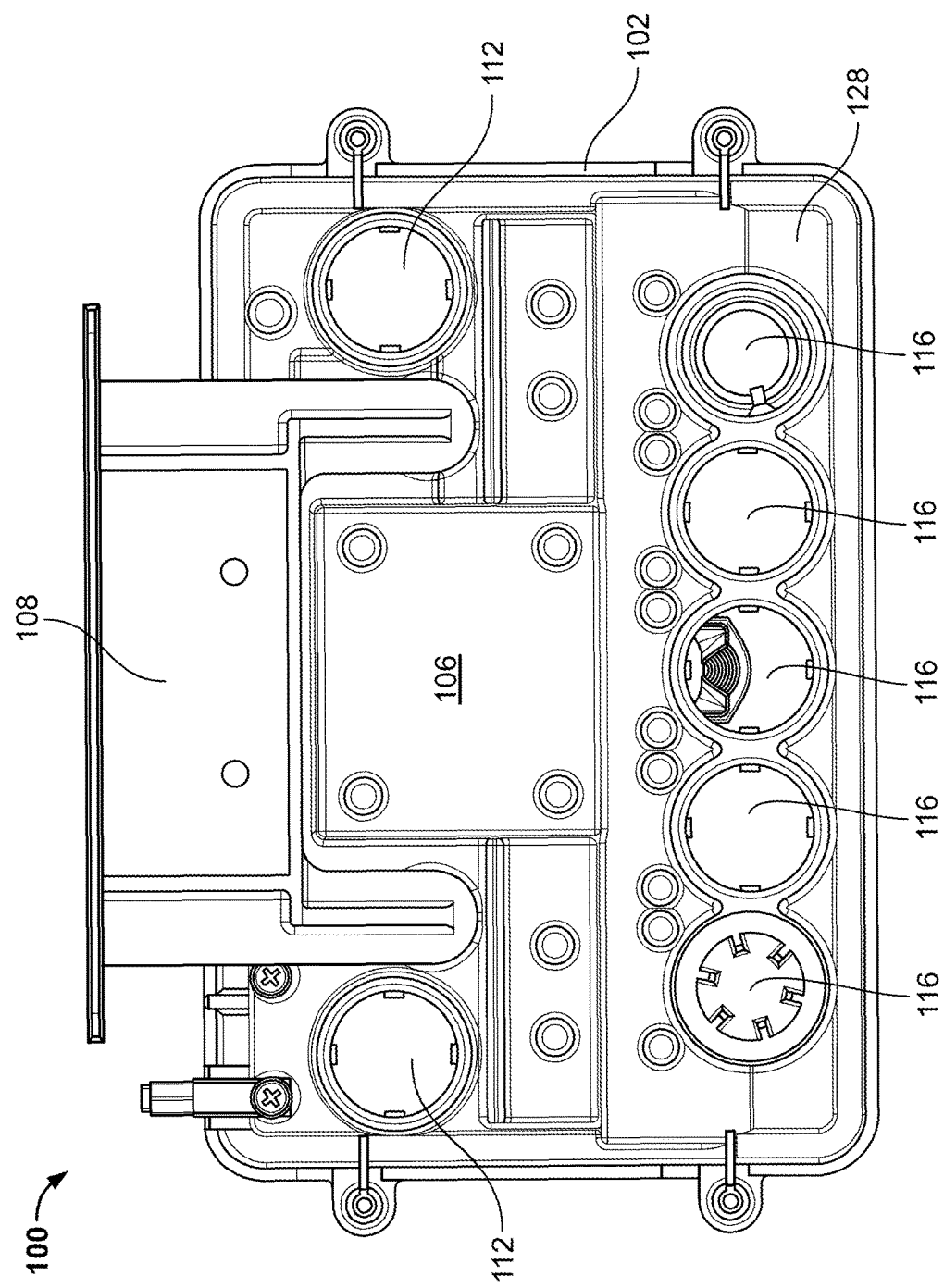
FIG. 6 shows a bottom plan view of the embodiment of FIGS. 1-5.
Figure 7:
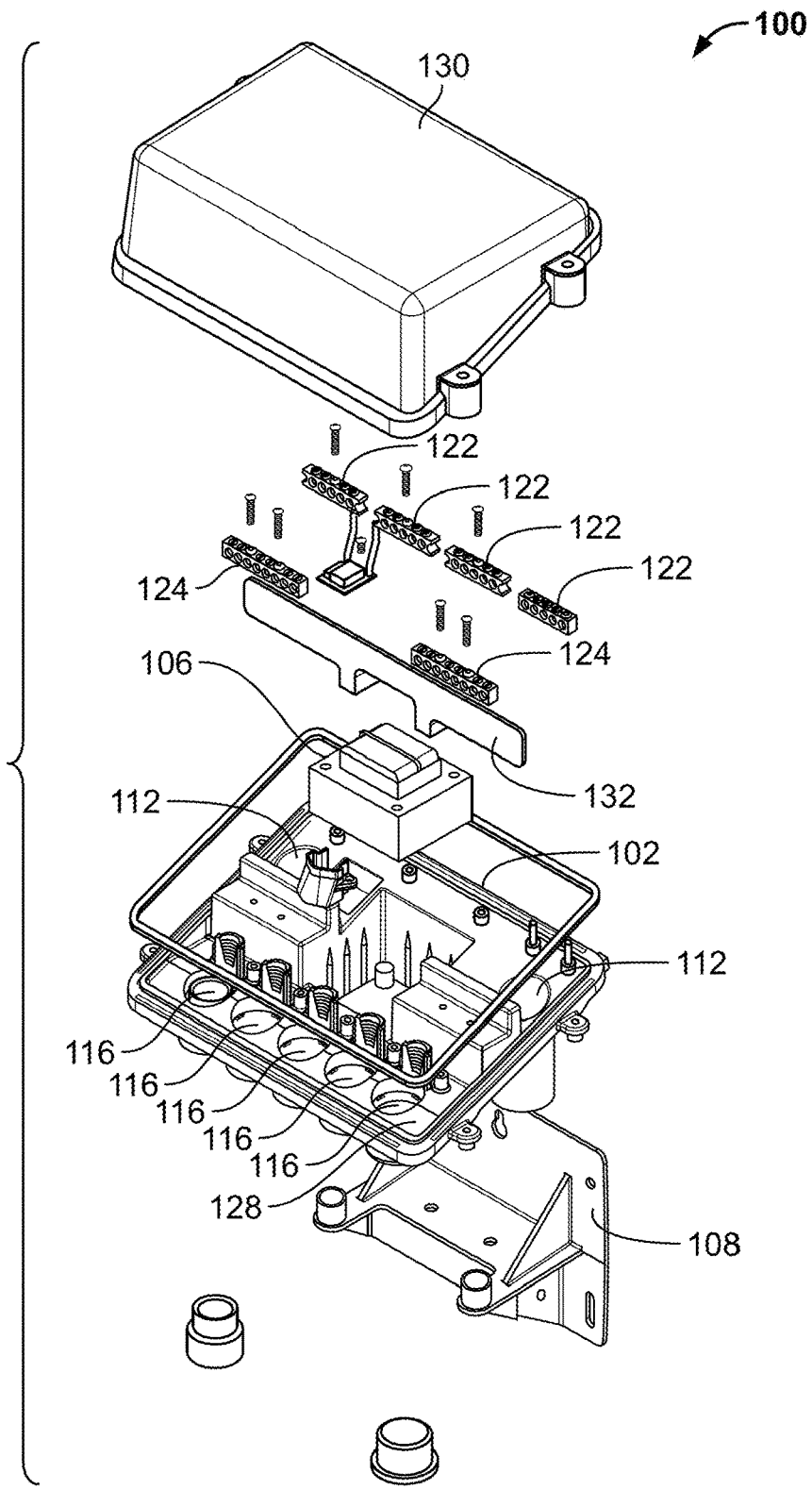
FIG. 7 shows an exploded view thereof.

As visible on the perspective view of FIG. 1, the side views of FIGS. 2-3, the top plan views of FIGS. 5-6, and the exploded view of FIG. 7, there may be two openings 112 from the bottom for primary wiring 114 to be routed into and out of the junction box along with five openings 116 to route the secondary wiring 118 out of the junction box to a load 120, which may be selected from underwater lights, pool/landscape lights, submersible electrical fixtures, and/or dimmable LED lights, by way of non-limiting examples. As to the two input openings 112 available, one is for line voltage (e.g., high voltage such as 120V) and the other one is for output of the same high voltage (120V), for example, to a high voltage load and/or to the next box 100 in a daisy chain connection, as shown in FIG. 5A, for the junction box function of the PJBX'. The five light outputs 116 may be at (high) 120V or (low) 12 VAC or 13 VAC. The input and output openings 112 and 116 preferably will accommodate ½", ¾" or 1" flexible conduits, (e.g., using fittings such as clips, grommets, and/or gaskets that preferably form a watertight seal around each conduit, where openings 112/116 not occupied by conduit preferably will be capped/plugged).

The wiring terminals 122 and 124 inside the junction box preferably will accept #16-3 to #10-2 AWG conductors. Wiring connections will be made via the supplied terminal blocks 122 and 124 inside the junction box. Wiring is shown in a diagrammatic/simplified form in FIGS. 5-5A, which will be understood by those of skill in the art to represent wiring paths but not show specific individual wires and circuits in the traditional manner of a wiring schematic or circuit diagram. Wring from a high-voltage supply (Line In) connects to the upper terminal blocks 122 via the input port 112 of the enclosure. Any lines that will stay at high voltage will be routed out from the terminal via an output opening 112 (and may go from there to a high-voltage load/device 140 or to another in a series of PJBX's, to a junction box, to a transformer box, or to another location). Wring directed toward a low-voltage load 120 will go from high voltage input via the transformer 106 to the lower terminal blocks 124, then travel through secondary wiring 118 out to the load(s) 120 exiting the enclosure 102 via one or more of the lower output port(s) 116. Primary (e.g., high-voltage) wiring 114 can go out to a high-voltage load and/or can connect multiple PJBXs in a daisy-chain configuration, as shown in FIG. 5A, which shows three PJBX's where those of skill in the art will appreciate that more or fewer PBJX's can be daisy-chained in this fashion. The routing of the secondary wiring 118 may be repeated for each of the other 4 output connections 116 within the enclosure/housing 102, going out to user-selected device(s) 120 with lower-voltage.

A wall mount 108 or a post mount 110 may be provided. The PJBX may be mounted via a wall mount 108, a post mount 110, and/or supported on rods 111 placed within the ground (not shown).

Figure 4:
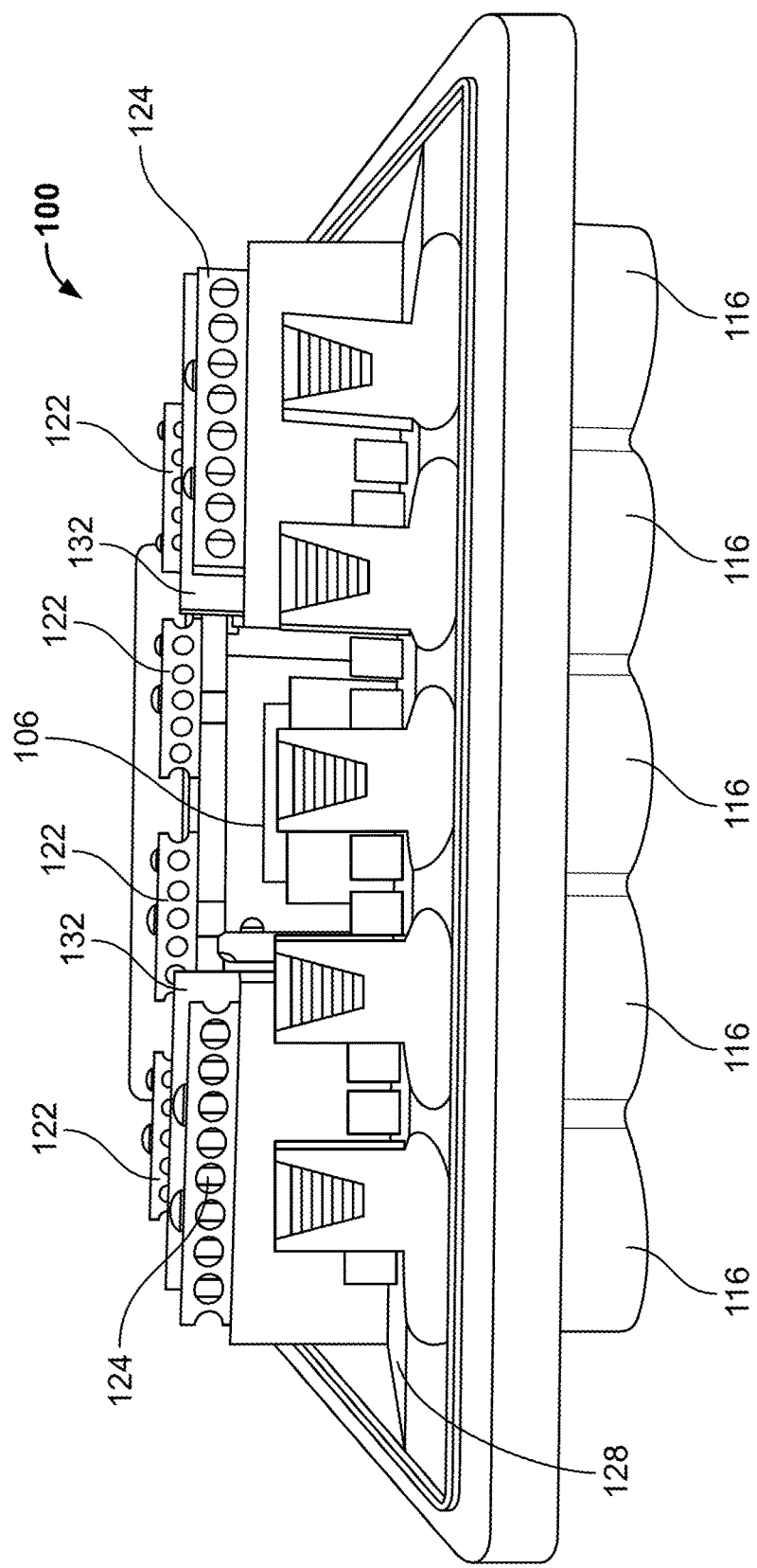
FIG. 4 a front elevation view thereof.

The transformer 106 has an input voltage of 120 VAC at 1.5 A max with output taps 124 of a nominal 12 VAC and 13 VAC; where, in preferred embodiments, this will not exceed 14 VAC. In the illustrated construction, as shown in FIGS. 1, 3, and 4, the transformer 106 is disposed so that most or all of its volume is within (that is, encompassed by) the base 128 so that it does not extend up into the volume defined within the cover 130 that is above the upper surfaces and contours of the base 128. And, the barrier 132 across it separates the upper/high-voltage region with terminals 122 from the lower/low-voltage region with terminals 124 (although the front elevation view of FIG. 4 omits showing the central portion of the barrier 132 above the transformer 106).

As shown in FIG. 5, the light loads and/or other load(s) 120 on the output(s) 116 of the transformer 106 preferably will be controlled with a selected one and only one of the following: a dimmer switch, a photocell switch, or a normal (i.e., binary state) on/off switch 126, where each of the light loads may be controlled by direct input or via a remote control (e.g., wireless radiofrequency or other remote control means known in the art for controlling lighting devices, where the wired and/or wireless control is intermediated by the switch and the switch communicates in a wired or wireless manner to control the light(s) or other load/electrical device(s)). The switch(es) and/or the junction box may also be equipped with a GFCI (ground fault circuit interrupter, not shown). The switch(es) 126 may be provided by the user. The switch 126 and the transformer 106 each will be grounded respectively, where the line in to the switch 126 in FIG. 5 is diagrammatically shown with hot, neutral, and ground. The switch 126 will be wired to the upper terminal blocks 122 in a voltage control relationship with the PJBX 100. The transformer 106 may be rated for dimming at an output rating of 100 W. The normal on/off switch 126 may be wired to the primary (incoming power) side 122 of the transformer 106 for ON/OFF control. The dimmer 126 may be wired to the primary side 122 of the transformer 106 to provide variable dimming of white LED lights. The photocell 126 may be wired to the primary side 122 of the transformer 106 to allow for dusk to dawn ON/OFF control.

Those of skill in the art will appreciate that embodiments not expressly illustrated herein may be practiced within the scope of the claims, including that features described herein for different embodiments may be combined with each other and/or with currently-known or future-developed technologies while remaining within the scope of the claims. Although specific terms are employed herein, they are used in a generic and descriptive sense only and not for purposes of limitation unless specifically defined by context, usage, or other explicit designation. It is therefore intended that the foregoing detailed description be regarded as illustrative rather than limiting. And, it should be understood that the following claims, including all equivalents, are intended to define the spirit and scope of this invention. Furthermore, the advantages described above are not necessarily the only advantages of the invention, and it is not necessarily expected that all of the described advantages will be achieved with every embodiment. In the event of any inconsistent disclosure or definition from the present application conflicting with any document incorporated by reference, the disclosure or definition herein shall be deemed to prevail.

We claim:

1. A combination transformer junction box for use with pool and/or spa lighting, comprising:
   a waterproof housing that includes a base and a cover;
   a first set of terminals for low voltage disposed upon the base;
   a second set of terminals for high voltage disposed upon the base, and separated from the first set of terminals by a barrier;
   a transformer disposed upon the base such that it is within the base and does not occupy a volume defined by the cover;
   a plurality of input ports through which wiring enters and/or exits the housing; and
   a plurality of output ports through which wiring exits the housing in a manner to conduct current to a load including one or more electrical devices after said current has been directed through at least two of: the transformer, at least one terminal of the first set of terminals, and at least one terminal of the second set of terminals.

2. The combination transformer junction box of claim 1, further comprising a wired or a wireless control relationship between a line in carrying current and the load, where the control relationship is intermediated by a selected one or more of a dimmer switch, a photocell switch, and a binary-state on/off switch.

3. The combination transformer junction box of claim 2, where the selected switch is a photocell switch and further comprising being configured for on/off control of power to the transformer corresponding to detection by the photocell switch of dawn and/or dusk lighting conditions.

4. The combination transformer junction box of claim 1, further comprising a wall mount, a post mount, or support rods.

5. The combination transformer junction box of claim 1, further comprising a plurality of such combination transformer junction boxes connected together in a daisy-chain configuration by a primary wiring.

6. The combination transformer junction box of claim 1, further comprising connection to one or more load devices selected from underwater lights, landscape lights, and submersible electrical fixtures.

7. The combination transformer junction box of claim 1, further comprising connection to one or more dimmable LED lights.

8. The combination transformer junction box of claim 1, further comprising a photocell switch and further comprising being configured for on/off control of current to the transformer corresponding to detection by the photocell switch of dawn and/or dusk lighting conditions, where a dusk or dark lighting condition turns a light on, and dawn or other daylight condition turns the light off.

9. The combination transformer junction box of claim 1, configured with a high-voltage line in where current from the line in is directed to and through the transformer, with transmission of lower voltage to the low-voltage first set of terminals and out to at least one low-voltage load device, and where current from the line in is also directed via a line out, through one of the input ports, to one or more of a high-voltage load device, a junction box, a transformer, and at least a second combination transformer junction box constructed according to claim 1.

10. A combination transformer junction box system, comprising a first combination transformer junction box according to claim 1, and at least a second combination transformer junction box according to claim 1, so that the system comprises a plurality of combination transformer junction boxes constructed according to claim 1.

* * * * *